3,824,106
SELF-DEGRADABLE GLASS CONTAINERS
Paul B. Adams, Painted Post, Benjamin Justice, Corning, and Francis J. Marusak, Painted Post, N.Y., assignors to Corning Glass Works, Corning, N.Y.
Filed Jan. 22, 1973, Ser. No. 325,726
Int. Cl. C03c 19/00, 3/04, 3/30
U.S. Cl. 106—52                               8 Claims

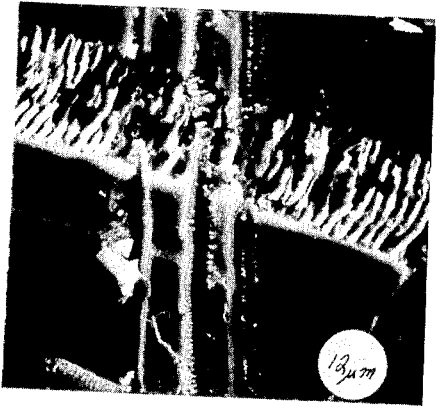 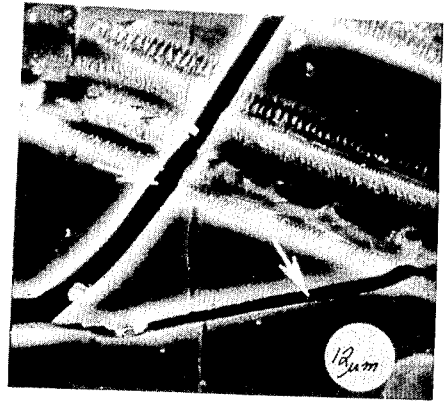
Fig. 1a    Fig. 1b
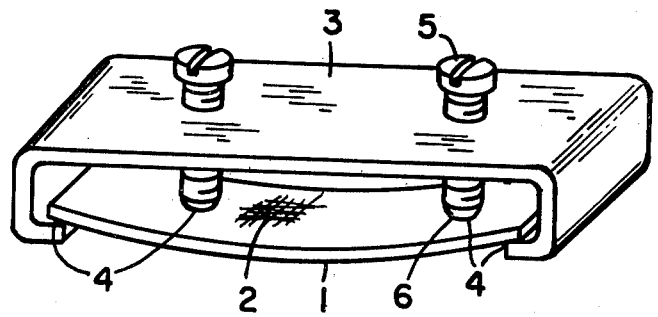
Fig. 2

ABSTRACT OF THE DISCLOSURE

The present invention relates to the production of glass articles and, in particular, containers having compositions within certain specifically-defined ranges of sodium silicate and potassium silicate glasses which are treated so as to cause self-degradation or disintegration into finely-divided particles. The glass articles should be under essentially zero compressive stress and the treatment thereof consists of placing fine flaws within the surface which will initiate cracking of the glass wall when contacted with moisture in the environment or immersion in liquid water.

---

Figure 3:

United States Application Ser. No. 249,289, filed May 1, 1972 in the name of Roger F. Bartholomew et al., includes an extensive discussion of glasses in the sodium and/or potassium silicate composition systems which can be formed into containers suitable for the storage of comestibles but which will, upon an overt act, spontaneously degrade or disintegrate in the ambient atmosphere into relatively non-polluting residual material. Briefly, that application discloses glasses consisting essentially, by weight on the oxide basis, of about 10–30% $Na_2O$ and/or $K_2O$, 65–90% $SiO_2$, and 0–20% of such optional compatible metal oxides as CaO, ZnO, MgO, $B_2O_3$, $ZrO_2$, $Al_2O_3$, SrO, PbO, BaO, $Fe_2O_3$, NiO, $TiO_2$, MnO, CuO, CoO, and FeO which will exhibit good chemical durability as formed, or, where necessary, can be treated in various ways to achieve good durability, and which, after being hydrated in a water-containing atmosphere at an elevated temperature, will exhibit limited resistance to weathering and may be leachable in water. Extended exposure to weathering and dehydration will lead to the degradation of these glasses through physical disintegration and/or chemical solution.

The physical disintegration mode of degradation contemplates the dehydration process resulting in the shrinking and cracking of the glass body leading to the final breakdown of the glass into a myriad of fine particles. In the chemical solution mode of degradation, the breakdown of the body occurs through weathering or other chemical attack of the body. Frequently, those two degradation mechanisms will take place at the same time. From an ecological point of view, the former degradation mechanism, viz., physical disintegration, is to be preferred inasmuch as the glass container would be returned to nature as "a pile of sand" whereas the product of chemical solution would permeate into the earth's soil.

Therefore, the approach to achieving a crackable bottle advanced by Ser. No. 249,289, supra, involved first hydrating at least a surface layer of a glass container and then securing the desired cracking through subsequent dehydration. From a commercial production point of view, elimination of the initial hydration step would result in considerable cost savings. The instant invention is directed to the formation of glass articles which will return to nature as "a pile of sand" without the requirement of prior hydration.

We have discovered that certain glasses in the $Na_2O$ and/or $K_2O$—$SiO_2$ composition system will disintegrate into fine particles in the presence of water in the ambient environment through chemically-induced stresses without any macro tension being applied prior thereto, i.e., no external load being applied and no tensile force being built into the glass. Such glasses consist essentially, in mole percent on the oxide basis, of about 13–31% $R_2O$, wherein $R_2O$ consists of 0–23% $K_2O$ and 0–31% $Na_2O$, the minimum amount of $K_2O$ being 13% when present alone and the minimum amount of $Na_2O$ being 17% when present alone, and the remainder $SiO_2$. Two further features are required for the invention to operate successfully. First, the glass body should be essentially free from compressive stresses. Second, a flaw of specified dimensions must be present within the surface of the article.

Table I reports four glass compositions, expressed in mole percent on the oxide basis, which were melted in open platinum or silica crucibles for about 16 hours at 1450°–1700° C. The batches therefor were compounded from materials, either oxides or other compounds, which, upon being melted together, are converted to the desired oxide compositions in the proper proportions. The batch ingredients were normally ballmilled together to aid in securing a homogeneous melt. The melts were cooled to working temperatures and bottles hand blown or ¼" diameter canes drawn employing an updraw-type cane drawing apparatus. The canes were cut into 4" lengths for further treatment.

TABLE I

| Percent: | 1 | 2 | 3 | 4 |
|---|---|---|---|---|
| $SiO_2$ | 76.0 | 73.5 | 74.0 | 81.4 |
| $Na_2O$ | 19.3 | 12.9 | 15.4 | |
| $K_2O$ | | 1.3 | 0.9 | 18.3 |
| $B_2O_3$ | | | 0.3 | |
| $Li_2O$ | | | 0.2 | |
| MgO | 4.4 | 1.5 | 3.8 | |
| CaO | | 7.7 | 3.7 | |
| MnO | | 0.4 | | |
| $Al_2O_3$ | 0.3 | 2.7 | 1.4 | |

Some of the cane samples were annealed while others were not. The bottles were given no anneal in addition to that obtained during forming.

Cane samples of each which had been annealed were abraded with 180 grit (about 83 microns) alumina abrasive paper and then immersed into solutions of 5% NaOH and 0.05% NaOH held at 95° C., water at 95° C., and water at room temperature (25° C.) for one hour. Table II recites the results.

TABLE II

| | 1 | 2 | 3 | 4 |
|---|---|---|---|---|
| Hot concentrated NaOH | No effect | Spalls | Spalls | Dissolves. |
| Hot dilute NaOH | Cracks | No effect | No effect | Do. |
| Hot $H_2O$ | do | do | do | Do. |
| Cold $H_2O$ | No effect | do | do | Cracks. |

It is of interest to note that Examples 2 and 3 exhibited some surface spalling when contacted with the hot concentrated alkali but cracking into the interior of the glass appeared to be absent. Immersion in the other liquids had no apparent effect thereon. In contrast to that phenomenon, Example 1 showed no apparent cracking or spalling in hot concentrated NaOH or in the water at room temperature, but evidenced marked cracking in dilute alkali and hot water. Finally, Example 4 dissolved in both the alkali solutions and hot water, the rate at which the glass dissolved being very rapid in the alkali solutions. Interestingly, Example 4 displayed considerable cracking when immersed in cold water.

Unannealed cane samples of Example 1 were abraded in like fashion and then immersed in water at 95° C. for one day. No cracking was observed thereby indicating that the stresses inherently present in the unnealed glass were sufficient to inhibit cracking.

To better understand the effect of flaws on the subsequent disintegration of the glass body, cane samples of Examples 1, 2, 3, and 4 were drawn and annealed and then, with no abrasion, were immersed into the above-described solutions for one hour. No effect whatsoever was noted in Examples 1, 2, and 3, whereas the cane samples of Example 4 manifested some solution in the NaOH and hot water solutions but no apparent effect was observed in the cold water immersion.

Several factors of critical importance are believed to be evident from the above studies. First, the composition of the glass is vital to secure crackability. Second, the chemistry and temperature of the contacting environment plays a significant role. Third, there must be surface flaw to initiate cracking. Fourth, the glass should be under near-zero compression.

That there is some relationship exisiting between the chemical durability of a glass and its crackability can be seen from Table I. Thus, Examples 2 and 3 are quite durable glasses and are attacked only with strong alkalies. Examples 1 and 4 are much less durable and exhibit the characteristic of crackability. Therefore, much of the following work recorded was undertaken with Examples 1 and 4. Example 1 cracks in water at 95° C. but will not crack in water at room tempeature nor does it corrode noticeably under such treatment. Example 4 is a relatively water-soluble glass that will crack and corrode in 25° C. water. In 95° C. water it simply dissolves away with no cracking.

A flaw in the surface of the glass appears to be essential to cause cracking thereof within a reasonable length of time as the following experiment will demonstrate. Thus, cane samples of Example 1, when abraded, will crack within an hour's immersion in water at 95° C. but, when in the as-formed or unabraded state, will exhibit no cracking even after several day's immersion.

FIG. 1a is a scanning electron micrograph of an outside wall of a handblown bottle of Example 1 which had been abraded with 180 grit abrasive paper. FIG. 1b is a scanning electron micrograph of the sample after immersion thereof for 20 hours in water at 95° C. The white arrows point to the cracks developed. There was no visible chemical degradation of the glass surface. The white circle in the lower right corner of each micrograph represents 12 micrometers (microns).

Example 1 was thereafter abraded with a series of grit size papers: 240, 320, 400, and 600 (2–35 micron particles), and with crocus cloth (1–5 micron particles). Upon immersion in 95° C. water, all produced cracking. The crocus cloth left tracks about 2½–5 microns wide at the surface.

It has been determined that the dimensions of the flaw are critical to the cracking phenomenon. Some force-generating chemical process must take place within the flaw to produce a wedging action on the walls thereof which will cause the flaw to propagate. The flaw must be large enough to permit the entry of a water molecule but in at least a portion thereof should not have a width greater than about 200 A. Therefore, it has been concluded that a flaw which will propagate in a moisture-containing environment will have a width between about 2–200 A. in at least some portion thereof and a length of at least 10 A. Such flaws appear to propagate very rapidly once initiated.

Although in the above studies the flaws were placed within the surface of the glass samples through mechanical abrasion and, for practical purposes, such would constitute the preferred mode, it must be recognized that any method which can produce flaws of the required dimensions such as, for example, selective chemical leaching, is operable therein.

Since it had been observed above that unannealed cane samples of Example 1 did not evidence cracking after being abraded and then immersed in water at 95° C., an experiment was undertaken to determine a minimum level of compression which was necessary to inhibit cracking. Bars about 4" x ½" x ⅜" were cut from handblown bottles of Example 1 and annealed. The edges thereof were polished and all surfaces were acid-etched to remove flaws therefrom. One side of the bar in the ½" dimension was abraded in the middle portion thereof with 180 grit abrasive paper in the direction parallel to the ½" dimension and the bar then placed in the apparatus schematically represented in FIG. 2. Thus, glass bar 1 with abraded portion 2 upright was inserted into stainless steel holder 3. Teflon® tape 4 was applied at both ends of bar 1 to prevent scratching by the metal of holder 3. Two stainless steel bolts 5 pass through holder 3 at points equidistant from the ends of bar 1 and contact bar 1 at points 6 in the center of the ½" dimension but beyond abraded portion 2. Pieces of Teflon® tape 4 are inserted beneath points 6 to again prevent scratching of the glass. The samples were loaded to put the abraded surface under compression by turning the screws. The loading was estimated by viewing the stress through the polished ⅜" edges. The entire device was then placed into a water bath operating at 95° C. along with a control sample of Example 1 which had been annealed but was under no load. Loadings of 500 p.s.i. and 250 p.s.i. maximum fiber stress were investigated with immersion times of four hours.

In each instance, the control sample exhibited numerous cracks. However, in the bar under stress, no cracks were observed at the 500 p.s.i. loading and at the 250 p.s.i. loading only a very few small cracks were observed running generally parallel to the axis of the bar.

From these data it appears that as little as about 250 p.s.i. compression is sufficient to inhibit crack growth. In those experiments, the compression and tension are longitudinal but essentially zero in the lateral direction.

In another experiment, bars of Example 4 abraded with 180 grit abrasive paper were immersed into water at 25° C. inside a 1000 p.s.i. hydrostatic-pressure tank such that pressure was applied equally to all surfaces. Those test samples appeared to crack as readily as a control sample immersed in water at 25° C. at atmospheric pressure thereby indicating that it is not the application of pressure alone that inhibits crack propagation but the presence of compressive stress in the surface.

Those two studies are believed to indicate rather dramatically that there is a restraining effect upon crack growth and propagation resulting from surface compression which is considered to be due either to squeezing the walls of the flaw together or in presenting a layer of compression which must be overcome before substantial cracking can occur.

Table III is an extension of Table I in summarizing the effect of the chemistry and temperature of the environment upon the degradation character of Examples 1 and 4. Annealed cane samples abraded with 180 grit abrasive paper were immersed for one hour into aqueous solutions which were compounded in terms of weight percent.

TABLE III

|  | 1 | | 4 | |
| --- | --- | --- | --- | --- |
|  | 25° C. | 95° C. | 25° C. | 95° C. |
| 5% NaOH | N.E.* | Dissolves | Dissolves | Dissolves. |
| 0.5% NaOH | N.E.* | Few cracks | Few cracks | Do. |
| 0.05% NaOH | N.E.* | Cracks | Cracks | Do. |
| $H_2O$ distilled | N.E.* | do | do | Do. |
| $H_2O$-tap | N.E.* | do | do | Do. |
| 0.05% $H_3PO_4$ | N.E.* | do | do | Do. |
| 0.05% HCl | N.E.* | do | do | Do. |
| 0.5% HCl | N.E.* | do | do | Do. |
| 5% HCl | N.E.* | Few cracks | do | Do. |
| 38% HCl | N.E.* | N.E.* | Dissolves | Do. |

*Not effected visually.

From this table, it can be seen that the inherent durability of Example 1 is sufficiently great to render it resistant to all of the solutions at 25° C. However, at 95° C. Example 1 will crack in weak acid and weak alkali solutions but will dissolve, without cracking, in concentrated alkali solutions. It appears to be unaffected by highly concentrated acid solutions.

The absence of cracking at very high alkalinity is believed to be due to chemical corrosion of the glass proceeding at a faster rate than the cracking process so that the swelling or wedging action in the flaws or cracks placed therein through abrasion does not occur. The lack of cracking at very high acidity has been concluded to be the result of a paucity of $H_2O$ under these conditions.

The inherent poor chemical durability of Example 4 is quite apparent from Table III. Hence, except in essentially neutral solutions and at low temperatures, the dissolution process takes place so rapidly that the swelling or wedging action in the flaws or cracks cannot take place before the cracking phenomenon occurs. As a further indication of the crackable character of Example 4, a solution was prepared by dissolving a portion of Example 4 in hot water. Thereafter, an annealed cane sample of Example 4 which had been abraded with 180 grit abrasive paper was immersed into that solution at 25° C. and substantial cracking appeared within an hour. Thus, Example 4 will crack under conditions where its glass reaction products remain in contact therewith. This latter feature is of interest as simulating situations where the abraded surface will be contacted with a wet atmosphere or where it will lie in its own reaction products.

Annealed canes of Examples 1 and 4 which had been abraded with 180 grit abrasive paper were placed in controlled humidity atmospheres operating at 100° C., 50° C., and 25° C. Example 1 cracked at 100% relative humidity at 100° C. and 50° C. but not at 25° C. Example 4 cracked at 100% relative humidity at 25° C. but the glass hydrated and flowed without cracking at 50° C. and 100° C.

Table III illustrates the important effect which temperature has upon the cracking properties of a glass. Hence, Example 1 will crack at 95° C. in water but not at 25° C., whereas Example 4 exhibits the reverse cracking tendency. Other glasses demonstrate the capability of cracking at both temperatures. Table IV records series of $Na_2O$—$SiO_2$ and $K_2O$—$SiO_2$ glass compositions of varying alkali metal content expressed in mole percent along with the time required to induce first cracking at 95° C. and 25° C. in annealed samples abraded with 180 grit paper. Also included is a measure of the chemical durability of a glass as evidenced by the loss of alkali metal oxide (micrograms per cm.²) after immersion in distilled water at 70° C. for 20 hours (samples unabraded).

TABLE IV

| Example number | Mole percent $R_2O$ | Chemical durability | Time to first crack | |
| --- | --- | --- | --- | --- |
|  |  |  | 95° C. | 25° C. |
| 5 | 14% $Na_2O$ | 85 | 1¾ hours | >60 days. |
| 6 | 16% $Na_2O$ | 116 | ½ hour | Do. |
| 7 | 18% $Na_2O$ | 224 | ¼ hour | 13 days. |
| 8 | 10% $K_2O$ | 80 | >6 hours | >60 days. |
| 9 | 12% $K_2O$ | 330 | do | Do. |
| 10 | 14% $K_2O$ | 1,440 | 1¼ hours | 20 days. |
| 11 | 16% $K_2O$ | 6,180 | ½ hour | 4 days. |

The data indicate that the $Na_2O$—$SiO_2$ glasses crack about 850 times more rapidly at 95° C. than at 25° C. and the $K_2O$—$SiO_2$ glasses about 300 times as fast at 95° C. as at 25° C.

Figure 4A:
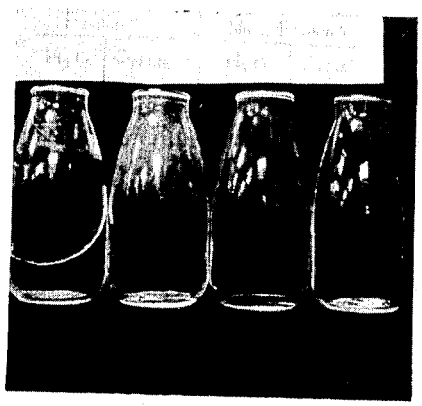
Figure 4B:
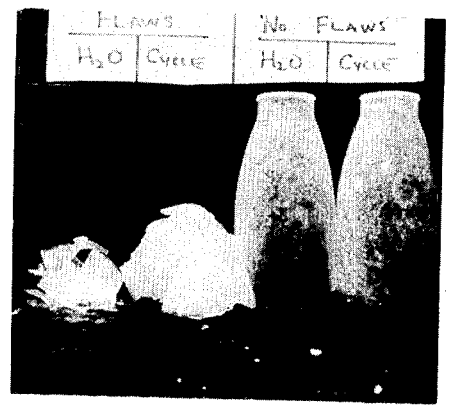

It is very difficult to accurately and objectively assess the rate of crack growth. Likewise, crack propagation is virtually impossible to meaningfully depict in the conventional line drawing. The best attempts at such lead to a semi-schematic sketch. Yet, it is the growth and subsequent propagation of the initial flaw which comprise the crux of the instant invention and the illustration thereof is believed to be particularly vital for a full understanding and appreciation of the phenomenon. Therefore, FIGS. 3, 4a, and 4b are included to pictorially demonstrate the flaw patterns and crack structures resulting from surface attack on abraded glasses of the present invention. As seen therein, the development and propagation of cracks closely approximates and simulates the grain structure present in crystalline materials. FIGS. 3, 4a, and 4b provide a true characterization thereof.

FIG. 3 presents a study of crack propagation in handblown bottles fabricated from the composition of Example 1 after having water at 70° C. being contained therein for 48 hours. The bottle at the right was abraded on the inside with 600 grit abrasive paper before the water was run in, whereas the bottle at the left was not so abraded. The extensive development and propagation of cracks giving the appearance of grain structure is immediately evident in the bottle at the right.

FIGS. 4a and 4b illustrate the disintegration of handblown bottles of Example 4 after immersion into water. FIG. 4a depicts the bottles at the commencement of the test, the two bottles at the left having been abraded on the outside surface with 600 grit abrasive paper whereas the two bottles at the right were not. The bottles were thereafter immersed into water at a temperature of 25° C. The cycle referred to in FIGS. 4a and 4b comprised alternately immersing the bottles into the water for 16 hours and then removing them therefrom for about eight hours. FIG. 4b clearly illustrates the substantial degradation of the abraded bottles to "a pile of sand" which will take place within six days under such conditions.

Table IV illustrates that $Na_2O$—$SiO_2$ glasses having a $Na_2O$-loss of less than about 100–200 micrograms/cm.² will not crack within a practical length of time, if ever, at 25° C. with a similar cutoff for the $K_2O$—$SiO_2$ glasses of about 500–1000 micrograms/cm.² $K_2O$.

Table V compares the effect of various alkalies at equimolar concentrations in alkali silicate composition binaries. For $Na_2O$, greater than 9 mole percent causes cracking at 95° C. in water and greater than 17 mole percent at 25° C. The chemical durability ($Na_2O$ loss) corresponding to the 25° C. cutoff is about 250 micrograms/cm.². For the $K_2O$—$SiO_2$ binary, greater than 11 mole percent $K_2O$ causes cracking at 95° C. and 13 mole percent $K_2O$ causes cracking at 25° C., the latter corresponding to a durability ($K_2O$ loss) of about 1000 micrograms/cm.². It will be noted that there is a greater spread in the mole percent $Na_2O$ required to cause cracking at 95° C. and at 25° C. than there is in the mole percent $K_2O$ required for the same purpose. The $Li_2O$—$SiO_2$ glasses do not crack. Annealed cane samples abraded with 180 grit abrasive paper were employed for testing for one hour immersions.

Since for normal practical purposes the self-degradation of the glass article into fine particles will take place under ambient conditions, the present invention is particularly drawn to glass compositions capable of so doing. Hence, $Na_2O$ and/or $K_2O$ contents capable of insuring disintegration at temperatures of 25° C. rather than the higher 95° C. temperature are emphasized.

TABLE V

| Mole percent alkali oxide | NaO—SiO2 Cracks | Durability | K2O—SiO2 Cracks | Durability | Li2O—SiO2 Cracks | Durability |
| --- | --- | --- | --- | --- | --- | --- |
| 6 | No | | No | | No | |
| 8 | No | | No | | No | |
| 10 | 95° C.—Yes | | No | 80 | No | |
| 12 | 95° C.—Yes | | 95° C.—Yes | 330 | No | |
| 14 | 95° C.—Yes | 85 | 25° C.—Yes | 1,900 | No | |
| 16 | 95° C.—Yes | 116 | 25° C.—Yes | 6,180 | No | |
| 18 | 25° C.—Yes | 244 | 25° C.—Yes | | No | |
| 20 | 25° C.—Yes | | 25° C.—Yes | | No | |
| 22 | 25° C.—Yes | | 25° C.—Yes | | No | |
| 24 | 25° C.—Yes | | Dissolves | | No | |
| 26 | 25° C.—Yes | | do | | No | |
| 28 | 25° C.—Yes | | do | | | |
| 30 | 25° C.—Yes | | | | | |
| 32 | Disintegrates | | | | | |

The rate and extent of cracking decrease with decreasing alkali content. Hence, at the low alkali extreme crackability cutoff, the glass may require several hours or days to crack significantly in water at 95° C. and several weeks at 25° C. However, as the alkali content of the glass is raised, those times can decrease to minutes at 95° C. and to a single day or less at 25° C.

Table VI reports the effect of substituting various metal oxides, which are commonly added to glass compositions to modify the melting and forming characteristics thereof as well as the resultant physical properties, for $SiO_2$ in the $Na_2O$—$SiO_2$ system. In each instance, it is immediately apparent that the $Na_2O$ level at which cracking will occur upon water immersion is raised. Both the 95° C. and 25° C. cutoffs appear to shift together except in the case of CaO substitutions which exert a smaller effect on the 95° C. cutoff than on the 25° C. cutoff. The substitutions were made in mole percent. Table VII sets out similar effects in the $K_2O$—$SiO_2$ system.

TABLE VIII

| Mole percent | | | |
| --- | --- | --- | --- |
| Na2O | K2O | 95° C. | 25° C. |
| 16 | 0 | Cracks | N.E.* |
| 12 | 4 | do | N.E.* |
| 8 | 8 | Partially dissolves | Cracks. |
| 4 | 12 | do | Do. |
| 0 | 16 | do | Do. |

*Not effected visually.

Cracking will occur in the presence or absence of obvious glass corrosion. For the more durable glasses, clean cracks appear all the way through the glass after immersion into water, leaving the surface apparently clear and undisturbed. In contrast, cracking taking place in the less durable glasses may be accompanied by glass surface corrosion. In any event, from the laboratory work undertaken, it has been concluded that the cracking mechanism cannot be directly correlated with glass corrosion.

TABLE VI

| Mole percent Na2O | No substitution Cracks | Durability | 4% MgO Cracks | Durability | 2% Al2O3 Cracks | Durability | 4% B2O3 Cracks | Durability | 4% CaO Cracks | Durability |
| --- | --- | --- | --- | --- | --- | --- | --- | --- | --- | --- |
| 6 | No | | No | | No | | No | | No | |
| 8 | No | | No | | No | | No | | No | |
| 10 | 95° C.—Yes | | No | | No | | No | | No | |
| 12 | 95° C.—Yes | | No | | No | | No | | 95° C.—Yes | |
| 14 | 95° C.—Yes | 85 | 95° C.—Yes | | No | | No | | 95° C.—Yes | |
| 16 | 95° C.—Yes | 116 | 95° C.—Yes | | No | | No | | 95° C.—Yes | |
| 18 | 25° C.—Yes | 244 | 95° C.—Yes | | 95° C.—Yes | | 95° C.—Yes | | 95° C.—Yes | |
| 20 | 25° C.—Yes | | 95° C.—Yes | | 95° C.—Yes | | | | | |
| 22 | 25° C.—Yes | | 25° C.—Yes | 332 | 95° C.—Yes | | | | | |
| 24 | 25° C.—Yes | | 25° C.—Yes | 537 | 25° C.—Yes | 690 | 95° C.—Yes | | 95° C.—Yes | 678 |
| 26 | 25° C.—Yes | | 25° C.—Yes | 1,120 | 25° C.—Yes | 1,360 | | | 25° C.—Yes | |
| 28 | 25° C.—Yes | | | | | | 25° C.—Yes | 792 | 25° C.—Yes | |
| 30 | Disintegration | | | | | | | | | |

TABLE VII

| | No substitution | | 4% CaO | | 2% Al2O3 | |
| --- | --- | --- | --- | --- | --- | --- |
| | Cracks | Durability | Cracks | Durability | Cracks | Durability |
| 6 | No | | | | | |
| 8 | No | | | | | |
| 10 | No | 80 | | | | |
| 12 | 95° C.—Yes | 330 | No | | | |
| 14 | 25° C.—Yes | 1,440 | No | | No | |
| 16 | 25° C.—Yes | 6,180 | No | 513 | 25° C.—Yes | |
| 18 | 25° C.—Yes | | 95° C.—Yes | | 25° C.—Yes | 4,476 |
| 20 | 25° C.—Yes | | 25° C.—Yes | | 25° C.—Yes | |
| 22 | 25° C.—Yes | | 25° C.—Yes | | | |
| 24 | Dissolves | | | | | |

Table VIII is illustrative of the fact that $Na_2O$ and $K_2O$ can be substituted for one another and the desired propagation of flaws will occur upon contact with water in glasses containing a mixture of $Na_2O$ and $K_2O$. However, the minimum effective total mole percent required of the mixture will generally be somewhat greater than that of $K_2O$ alone and somewhat less than that of the $Na_2O$ alone.

At least two product concepts for containers which would be capable of self-degradation, but yet could safely hold beverages or other comestibles, are suggested from the above work. The first of these would involve abrading at least a portion of the outside surface of a container and then coating both the inside and the outside surfaces thereof with an impermeable material such as, for example, an organic plastic. To initiate degradation, at least part of this coating over the abraded surface would be removed. The second embodiment would contemplate chemical durabilizing the inside surface of the container by treatment, for example, with $SO_2$ or $SO_3$ containing gas, or by removing $Na^+$ and/or $K^+$ ions from the surface through a $Li^+$ ion exchange reaction. (If more convenient in the stream of commercial production, the outside surface of the container could also be so treated.) Thereafter, the outside surface would be abraded to penetrate the treated layer, if present, and an impermeable coating applied thereover. The initiation of cracking would begin when at least part of the coating over the abraded surface was removed.

As was observed above, the $Na_2O$ and/or $K_2O$—$SiO_2$ glasses of the invention do not exhibit high chemical durability. Thus, in the main, the glasses compare quite unfavorably with the soda-lime-silica glasses conventionally utilized in the manufacture of glass bottles and jars. A value of 10 micrograms/cm.$^2$ loss of $Na_2O$ after exposure to distilled water for 20 hours at 70° C. was set up as the standard for product requirements. That value is approximately equivalent to a limit of 50 parts/million $Na_2O$ in the beverage or other material within the container when stored for about a year. Table V illustrates that cracking occurs only where the weight loss of $Na_2O$ (or $K_2O$) is much higher than 10 micrograms/cm.$^2$. However, lithium ion exchange, and to a lesser extent $SO_2$ treatment, greatly improve the durability of these glasses.

For instance, Example 4 will exhibit an alkali loss in the above test in excess of 10,000 micrograms/cm.$^2$ $Na_2O$ but, after lithium ion exchange (immersion in a bath of $Li_2SO_4 + K_2SO_4 + ZnSO_4$ operating at 550° C. for 1–4 hours), the loss will be reduced to about 5 micrograms/cm.$^2$. Such a process would be extremely useful with poorly durable glasses like Example 4. The $SO_2$ treatment (exposure to vaporous $SO_2$ for 60 minutes at 525° C.) will provide a factor of improvement in chemical durability of about 75 times. This, then, permits the use of glasses having alkali losses up to about 750 micrograms/cm.$^2$ which, as reported in Table V, exhibit good crackability at room temperature.

Figure 5A:
Figure 5B:
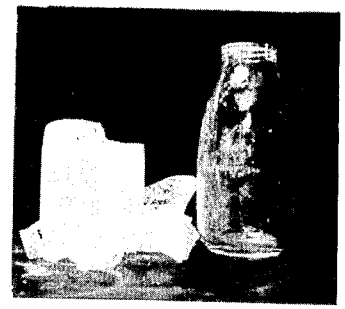

Since disintegration of the glass articles to "a pile of sand" demands contact with $H_2O$, two ambient degradation environments for the containers can be contemplated: (1) liquid water, i.e., disposal in a body of water or in a landfill and (2) relatively high humidity, i.e., disposal on the landscape. FIG. 4b pictures disintegration of bottles of Example 4 in about one week through immersion in water. FIGS. 5a and 5b illustrate the degradation of bottles scored with 180 grit abrasive paper after exposure to the outdoor environment at Corning, New York during January and February. Hence, FIG. 5a records the bottle after one month and FIG. 5b depicts the substantial disintegration which has taken place after two months. In each Figure, the abraded sample is at the left.

In sum, the satisfactory operation of the instant invention is founded upon four factors:

(1) the glass body should consist essentially, in mole percent on the oxide basis, of about 13–31% $R_2O$, wherein $R_2O$ consists of 0–23% $K_2O$ and 0–31% $Na_2O$, the minimum of $K_2O$ being 13% when present alone and the minimum amount of $Na_2O$ being 17% when present alone, and the remainder $SiO_2$;

(2) the glass body ought to be essentially free from compressive stresses;

(3) the glass body must contain a flaw within the surface thereof having a length of at least 10 A. and a width between about 2–200 A. in at least some portion thereof; and (4) the glass body will be contacted with water either in the liquid or vapor state.

The addition of all such compatible metal oxides as MgO, $Al_2O_3$, $B_2O_3$, and CaO will, most preferably, be held below about 5 mole percent since such additions tend to reduce the cracking capability of the glass although beneficial effects may be observed in melting and forming the glass and in its ultimate chemical and physical characteristics.

The glasses will self-disintegrate in aqueous solutions having pH values from about 0.1–13, the rate thereof normally being slower at the two extremes of the range.

We claim:

1. A glass article capable of self-disintegration into fine particles like a pile of sand, when contacted with an aqueous solution exhibiting a pH ranging between about 0.1–13, consisting essentially, in mole percent on the oxide basis, of about 13–31% $R_2O$, wherein $R_2O$ consists of 0–23% $K_2O$ and 0–31% $Na_2O$, the minimum $K_2O$ being 13% when present alone and the minimum $Na_2O$ being 17% when present alone, with the remainder $SiO_2$, said glass being essentially free from compressive stresses and having been treated so as the contain a flaw within a surface thereof having a length of at least 10 A. and a width between about 2–200 A. in at least some portion thereof, which flaw will initiate cracking of the glass when contacted with said aqueous solution.

2. A glass article according to claim 1 wherein said contact with said aqueous solution is made at ambient conditions.

3. A glass article according to claim 1 wherein said aqueous solution is liquid water.

4. A glass article according to claim 1 wherein said aqueous solution is water vapor.

5. A method for making a glass article capable of self-disintegration into fine particles like a pile of sand, when contacted with an aqueous solution exhibiting a pH ranging between about 0.1–13, comprising the steps of:

(a) melting a batch for a glass consisting essentially, in mole percent on the oxide basis, of about 13–31% $R_2O$, wherein $R_2O$ consists of 0–23% $K_2O$ and 0–31% $Na_2O$, the minimum $K_2O$ being 13% when present alone and the minimum $Na_2O$ being 17% when present alone, with the remainder $SiO_2$;

(b) cooling and forming said melt into an article of a desired configuration, annealing said article and then (c) producing a flaw within a surface of said article having a length of at least 10 A. and a width between about 2–200 A. in at least some portion thereof, which flaw will initiate cracking of the glass when contacted with said aqueous solution.

6. A method according to claim 5 wherein said contact with said aqueous solution is made at ambient conditions.

7. A method according to claim 5 wherein said aqueous solution is liquid water.

8. A method according to claim 5 wherein said aqueous solution is water vapor.

References Cited

UNITED STATES PATENTS 3,726,657  4/1973  Ver Dow _____ 65—23

FOREIGN PATENTS 19,576  7/1970  Japan _____ 106—38.27

OTHER REFERENCES

Hulbert et al.—"Improving Package Disposability," paper presented Sept. 24, 1969, San Francisco, Calif., First National Conference on Packaging Wastes, pp. 26, 31, 33–36.

HELEN M. McCARTHY, Primary Examiner

U.S. Cl. X.R.

65—23, 31, 33, 60, 61; 106—54; 215—1 C